United States Patent
Okayama (10) Patent No.: US 9,804,328 B2
(45) Date of Patent: Oct. 31, 2017

(54) OPTICAL MULTIPLEXING AND DE-MULTIPLEXING ELEMENT AND ARRAYED-WAVEGUIDE GRATING-TYPE OPTICAL WAVELENGTH FILTER

(71) Applicants: Oki Electric Industry Co., Ltd., Tokyo (JP); Photonics Electronics Technology Research Association, Tokyo (JP)

(72) Inventor: Hideaki Okayama, Tokyo (JP)

(73) Assignees: Oki Electric Industry Co., Ltd., Tokyo (JP); Photonics Electronics Technology Research Association, Tokyo (JP)

( * ) Notice: Subject to any disclaimer, the term of this patent is extended or adjusted under 35 U.S.C. 154(b) by 0 days.

(21) Appl. No.: 15/377,268

(22) Filed: Dec. 13, 2016

(65) Prior Publication Data

US 2017/0227713 A1 Aug. 10, 2017

(30) Foreign Application Priority Data

Feb. 9, 2016 (JP) .................................. 2016-022694

(51) Int. Cl.
*G02B 6/12* (2006.01)
*G02B 6/28* (2006.01)
*G02B 6/122* (2006.01)

(52) U.S. Cl.
CPC ....... *G02B 6/12016* (2013.01); *G02B 6/1228* (2013.01); *G02B 6/2813* (2013.01);
(Continued)

(58) Field of Classification Search
CPC .............. G02B 6/12016; G02B 6/1228; G02B 6/2813; G02B 2006/12061; G02B 2006/12097
See application file for complete search history.

(56) References Cited

U.S. PATENT DOCUMENTS 5,629,992 A * 5/1997 Amersfoort ........ G02B 6/12016
385/14
5,889,906 A * 3/1999 Chen .................. G02B 6/12011
385/24
(Continued)

FOREIGN PATENT DOCUMENTS

JP 11030723 A * 2/1999
JP H11-030723 A 2/1999
(Continued)

OTHER PUBLICATIONS

P. Dumon, W. Bogaerts, D. Van Thourhout, D. Taillaert, R. Baets, J. Wouters, S. Beckx, and P. Jaenen, "Compact wavelength router based on a Silicon-on-insulator arrayed waveguide grating pigtailed to a fiber array," Opt. Express 14, 664-669 (2006).*
(Continued)

*Primary Examiner* — Peter Radkowski
(74) *Attorney, Agent, or Firm* — Rabin & Berdo, P.C.

(57) ABSTRACT

There is provided an optical multiplexing and de-multiplexing element which is provided with a slab waveguide and a waveguide structure and can reduce radiation loss caused in a connection part between the slab waveguide and the waveguide structure. The waveguide structure includes a multimode interference (MMI) waveguide coupler and a narrow-width waveguide, the MMI waveguide coupler and the narrow-width waveguide are connected to each other in this order from a connection position with the slab waveguide along the waveguide direction, step portions are formed on both sides of the MMI waveguide coupler along the waveguide direction, and the thickness of the step portion is smaller than the thickness of the MMI waveguide coupler.

7 Claims, 9 Drawing Sheets

(52) U.S. Cl.
CPC .............. *G02B 2006/12061* (2013.01); *G02B 2006/12097* (2013.01)

(56) References Cited

U.S. PATENT DOCUMENTS

| | | | |
|---|---|---|---|
| 6,374,013 B1* | 4/2002 | Whiteaway | G02B 6/12011 385/140 |
| 6,442,308 B1* | 8/2002 | Han | G02B 6/12011 385/24 |
| 7,065,273 B2* | 6/2006 | Bhowmik | G02B 6/12016 385/31 |
| 2003/0032285 A1* | 2/2003 | Beguin | G02B 6/12011 438/689 |

FOREIGN PATENT DOCUMENTS

| | | | |
|---|---|---|---|
| JP | 11248949 A | * | 9/1999 |
| JP | H11-248949 A | | 9/1999 |
| JP | 2014-174223 A | | 9/2014 |
| JP | 2014174223 A | * | 9/2014 |

OTHER PUBLICATIONS

Wim Bogaerts et al., "Silicon-on-Insulator Spectral Filters Fabricated With CMOS Technology", IEEE Journal of Selected Topics in Quantum Electronics, vol. 16, No. 1, pp. 33-44, Jan.-Feb. 2010.

Daoxin Dai et al., "Ultrasmall Overlapped Arrayed-Waveguide Grating Based on Si Nanowire Waveguides for Dense Wavelength Division Demultiplexing", IEEE Journal of Selected Topics in Quantum Electronics, vol. 12, No. 6, pp. 1301-1305, Nov.-Dec. 2006.

Jaegyu Park et al., "Improved performance of a silicon arrayed waveguide grating by reduction of higher order mode generation near the boundary of a star coupler", Proceedings of SPIE, Silicon Photonics X, vol. 9367, pp. 936705-1-6, Feb. 27, 2015.

* cited by examiner

OPTICAL MULTIPLEXING AND DE-MULTIPLEXING ELEMENT AND ARRAYED-WAVEGUIDE GRATING-TYPE OPTICAL WAVELENGTH FILTER

CROSS REFERENCE TO RELATED APPLICATION(S)

This application is based upon and claims benefit of priority from Japanese Patent Application No. 2016-022694, filed on Feb. 9, 2016, the entire contents of which are incorporated herein by reference.

BACKGROUND

The present invention relates to an optical multiplexing and de-multiplexing element usable for multiplexing and de-multiplexing of light components having different wavelengths in wavelength division multiplex (WDM) communication and the like, and an arrayed-waveguide grating-type optical wavelength filter provided with this optical multiplexing and de-multiplexing element.

Recently, as an optical subscriber access system, a passive optical network (PON) communication system has become mainstream in which one optical line terminal (OLT) and a plurality of subscriber-side optical network units (ONUs) are connected via optical fibers and a star coupler, and one OLT is shared by the plurality of the ONUs. In this communication system, an optical signal wavelength used in down-link communication and an optical signal wavelength used in up-link communication are made different so as to cause the down-link communication from the OLT toward the ONU and the up-link communication from the ONU toward the OLT not to interfere with each other.

In the optical subscriber access system, further there has been studied a wavelength division multiplexed-PON (WDM-PON) which improves the multiplicity of wavelengths to be used for communication. The WDM-PON needs an optical element to perform the multiplexing and de-multiplexing of optical beams having a plurality of wavelengths for the OLT and the ONU.

An example of such an optical element is an arrayed waveguide grating (AWG). In the AWG, an input waveguide, an input-side slab waveguide, an arrayed waveguide including a plurality of channel waveguides having different optical path lengths, an output-side slab waveguide and an output waveguide are formed on the same substrate as a planar lightwave circuit (PLC). However, in a quartz light waveguide having a small refraction difference between a core and a clad, it is difficult to reduce the curvature radius of a curved light waveguide and the AWG cannot be made small.

Accordingly, an example of configuring the AWG is reported for a silicon fine wire waveguide using a core made of silicon (Si) and a clad made of silicon oxide ($SiO_2$) having a large refraction difference relative to silicon (refer to non-patent literature 1 (Wim Bogaerts, et al., "Silicon-on-Insulator Spectral Filters Fabricated With CMOS Technology", IEEE Journal of Selected Topics in Quantum Electronics, vol. 16, No. 1, pp. 33 to 44 (2010)), and non-patent literature 2 (Daoxin Dai et al., "Ultrasmall Overlapped Arrayed-Waveguide Grating Based on Si Nanowire Waveguides for Dense Wavelength Division Demultiplexing", IEEE Journal of Selected Topics in Quantum Electronics, vol. 12, No. 6, pp. 1301 to 1305 (2006)), for example). In the silicon fine wire waveguide, the refractive index of a core is extremely larger than the refractive index of a clad, and therefore the curved light waveguide having strong confinement of light and having a sufficiently small curvature radius can be formed. Further, since the silicon fine wire waveguide can be manufactured by the use of the process technique for a silicon electronic device, it is possible to realize a cross-sectional structure having an extremely fine submicron size. Accordingly, it is possible to make the AWG small by using the silicon fine wire waveguide.

However, in the AWG using the silicon fine wire waveguide, there is known that a non-negligible radiation loss is caused at a connection part between an input-side or output-side slab waveguide and a channel waveguide configuring the AWG. As a method of reducing this radiation loss, a rib waveguide structure is tried to be used for the waveguide configuring the AWG. However, when the rib waveguide structure is employed, a non-negligible loss is caused in this part unless the curvature radius of the curved waveguide part is increased. Accordingly, there has been a trial of reducing the radiation loss by using a special rib waveguide (refer to non-patent literature 3 (Jaegyu Park, et al., "Improved performance of a silicon arrayed waveguide grating by reduction of higher order mode generation near the boundary of a star coupler", Proceedings of SPIE vol. 9367, pp. 936705-1 to 6 (2015)).

Further, patent literature 1 (U.S. Pat. No. 6,442,308 B1) discloses that, for the radiation loss caused at the connection part between the input-side or output-side slab waveguide and the channel waveguide configuring the AWG, a waveguide mode coupler is utilized for equalizing a radiation loss caused in each of a plurality of waveguides configuring the channel waveguide.

SUMMARY

However, in the rib waveguide disclosed in the above non-patent literature 3, a shallow step etching technique is used and a high level technique is necessary in the manufacturing process.

Further, in the AWG disclosed in patent literature 1, while equalization of the radiation loss in the channel waveguide is realized, the subject of reducing the radiation loss itself is not achieved.

Accordingly, as the result of diligent study, the inventors of the present invention have found that the radiation loss can be reduced by a special configuration of the connection part between the channel waveguide and the input-side or the output-side slab waveguide, in the optical multiplexing and de-multiplexing element to be used in the AWG-type optical wavelength filter.

The present invention is achieved from the above findings, and aims to provide an optical multiplexing and de-multiplexing element in which a slab waveguide is connected to a waveguide structure configured with a group of a plurality of fundamental propagation mode waveguides and a radiation loss caused at a connection part between the slab waveguide and the waveguide structure is reduced. Further, the present invention aims to provide an AWG-type optical wavelength filter employing this optical multiplexing and de-multiplexing element for a connection part between an input-side or output-side slab waveguide and a plurality of channel waveguides.

For achieving the above object, an optical multiplexing and de-multiplexing element according to an embodiment of the present invention is configured with a slab waveguide and a waveguide structure. The waveguide structure includes a multi-mode interference (MMI) waveguide coupler and a narrow-width waveguide, and the MMI waveguide coupler and the narrow-width waveguide are connected with each other in this order from a connection position with the slab waveguide along a waveguide direction. Step portions are formed on both sides of the MMI waveguide coupler along the waveguide direction, and the thickness of the step portion is smaller than the thickness of the MMI waveguide coupler.

According to the above preferable example of the optical multiplexing and de-multiplexing element, for example, an MMI width change portion may be provided between the MMI waveguide coupler and the narrow-width waveguide, the MMI width change portion may have a first MMI tapered portion and a second MMI tapered portion having taper angles different from each other, and the first MMI tapered portion and the second MMI tapered portion may be configured to be connected with each other in this order along the waveguide direction.

Further, an AWG-type optical wavelength filter according to an embodiment of the present invention includes an input waveguide, an input-side slab waveguide, an input-side waveguide structure, an arrayed waveguide including a plurality of channel waveguides having different optical path lengths, an output-side waveguide structure, an output-side slab waveguide, and an output waveguide, and, in the AWG-type optical wavelength filter, the input waveguide, the input-side slab waveguide, the input-side waveguide structure, the arrayed waveguide, the output-side waveguide structure, the output-side slab waveguide, and the output waveguide are connected in this order, and each of a set of the input-side slab waveguide and the input-side waveguide structure and a set of the output-side slab waveguide and the output-side waveguide structure may correspond to the optical multiplexing and de-multiplexing element.

In the optical multiplexing and de-multiplexing element according an embodiment of the present invention, since the configuration of an area connecting the waveguide structure and the slab waveguide has the above feature, as described below, it is possible to reduce the radiation loss caused at this connection part.

Further, in the AWG-type optical wavelength filter according to an embodiment of the present invention, each of a connection area between the arrayed waveguide and the input-side slab waveguide and a connection area between the arrayed waveguide and the output-side slab waveguide is formed by using the above described optical multiplexing and de-multiplexing element. Accordingly, an AWG-type optical wavelength filter having a reduced radiation loss caused in both of the connection areas is realized.

DETAILED DESCRIPTION OF THE EMBODIMENT(S)

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

(First Optical Multiplexing and De-Multiplexing Element)

Figure 1A:
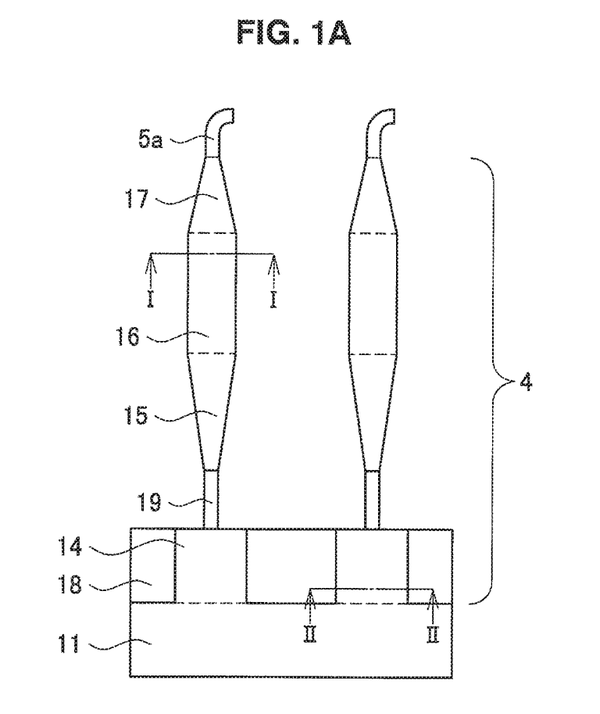
FIG. 1A is a diagram for explaining a first optical multiplexing and de-multiplexing element and is a schematic configuration diagram of a waveguide core configuring the first optical multiplexing and de-multiplexing element.
Figure 1B:
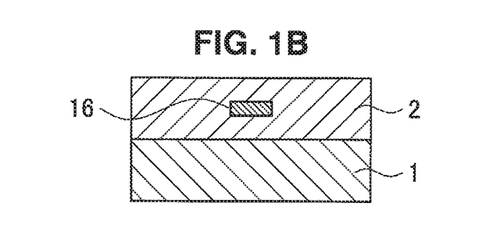
FIG. 1B is a diagram for explaining the first optical multiplexing and de-multiplexing element and is a schematic cross-sectional view at a position indicated by I-I of FIG. 1A.
Figure 1C:
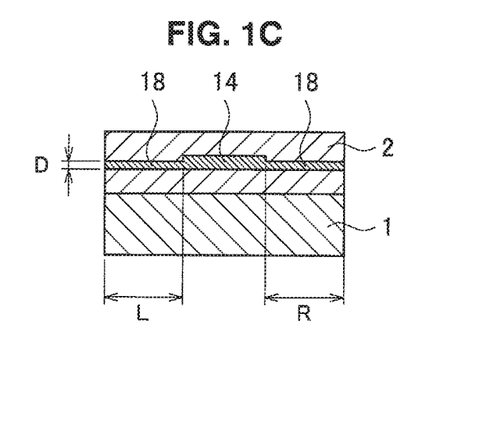
FIG. 1C is a diagram for explaining the first optical multiplexing and de-multiplexing element and is a schematic cross-sectional view at a position indicated by II-II of FIG. 1A.

With reference to FIG. 1A to FIG. 1C, there will be explained an optical multiplexing and de-multiplexing element according to a first embodiment of the present invention (in the following, referred to as a first optical multiplexing and de-multiplexing element). FIG. 1A is a diagram to show a schematic configuration for a planar pattern of a waveguide core configuring the first optical multiplexing and de-multiplexing element. FIG. 1B is a schematic configuration diagram when the waveguide core is cut at a position indicated by I-I of FIG. 1A in along a plane perpendicular to a waveguide direction. Further, FIG. 1C is a schematic configuration diagram when the waveguide core is cut at a position indicated by II-II of FIG. 1A along a plane perpendicular to the waveguide direction.

As shown in FIG. 1A, the first optical multiplexing and de-multiplexing element is provided with a slab waveguide 11 and a waveguide structure 4. The waveguide structure 4 is configured with a multi-mode interference (MMI) waveguide coupler 14, a narrow-width waveguide 19, a first tapered waveguide 15, a wide-width waveguide 16 and a second tapered waveguide 17 that are connected in this order from a connection position with the slab waveguide 11 along the waveguide direction.

As shown in FIG. 1A and FIG. 1B, a waveguide core configuring the narrow-width waveguide 19, the first tapered waveguide 15, the wide-width waveguide 16 and the second tapered waveguide 17 is surrounded by a clad layer 2 and formed on a substrate 1. The cross-sectional shape is a rectangle when the waveguide core is cut along a plane perpendicular to the waveguide direction.

Further, as shown in FIG. 1A and FIG. 1C, a step portion 18 having a thickness D smaller than the thickness of the MMI waveguide coupler 14 is formed in each of a left-side waveguide area L and a right-side waveguide area R which are areas on both sides of the MMI waveguide coupler 14 along the waveguide direction. The waveguide core configuring the MMI waveguide coupler 14 and the waveguide cores configuring the step portions 18 are sandwiched by the clad layers 2 in the vertical direction, and integrally formed on the substrate 1.

The step portion 18 may exist across the whole waveguide structure 4. In this case, light confinement of the waveguide becomes weak and therefore it is necessary to increase the curvature radius of the waveguide. As the result, the element size becomes larger. Accordingly, preferably the step portion 18 is provided only in the areas on both sides of the MMI waveguide coupler 14. In this configuration example, the step portion 18 and the MMI waveguide coupler 14 are configured to have equal lengths from the connection part with the slab waveguide 11.

Note that the step portion 18 can be provided in any place except for the narrow-width waveguide 19. If the light amount between the MMI waveguide couplers 14 becomes sufficiently small, the length of the step portion 18 from the connection part with the slab waveguide 11 may be smaller than the length of the MMI waveguide coupler 14 from the connection part with the slab waveguide 11.

Preferably, a silicon substrate is used for the substrate 1 shown in FIG. 1B and FIG. 1C, and the clad layer 2 is made of silicon oxide. Further, preferably the waveguide core configuring the waveguide structure 4 is made of silicon.

Preferably the width of the narrow-width waveguide 19 at the connection part with the MMI waveguide coupler 14 is approximately a width to collect light wave-guided in the MMI waveguide coupler 14, and, for example, is set to 800 nm. Further, preferably the width of the narrow-width waveguide 19 at the connection part with the first tapered waveguide 15 is approximately a width to realize a single mode, and, for example, is set to 300 to 500 nm.

When this optical multiplexing and de-multiplexing element is used for the AWG-type optical wavelength filter, the waveguide structure 4 is connected to the slab waveguide 11 at one end and connected to the channel waveguide at the other end. For preventing mode conversion from being caused in this channel waveguide, preferably the width of the channel waveguide is approximately a width to realize a single mode, and, for example, is set to 300 to 500 nm.

Further, in this waveguide structure 4, for suppressing a phase error caused by a width difference, the wide-width waveguide 16 is provided. The first tapered waveguide 15 and the second tapered waveguide 17 are provided in the connection area between the wide-width waveguide 16 and the narrow-width waveguide 19 and the connection area between the wide-width waveguide 16 and the channel waveguide, respectively, for suppressing a loss in these areas.

The first tapered waveguide 15 has a tapered shape in which the width gradually widens from the narrow-width waveguide 19 to the wide-width waveguide 16. Further, the second tapered waveguide 17 has a tapered shape in which the width gradually narrows from the wide-width waveguide 16 to the channel waveguide.

Note that, when the phase error in the waveguide structure 4 needs not be taken into consideration, the configuration does not have to include the first tapered waveguide 15, the wide-width waveguide 16, or the second tapered waveguide 17.

(Second Optical Multiplexing and De-Multiplexing Element)

Figure 2:
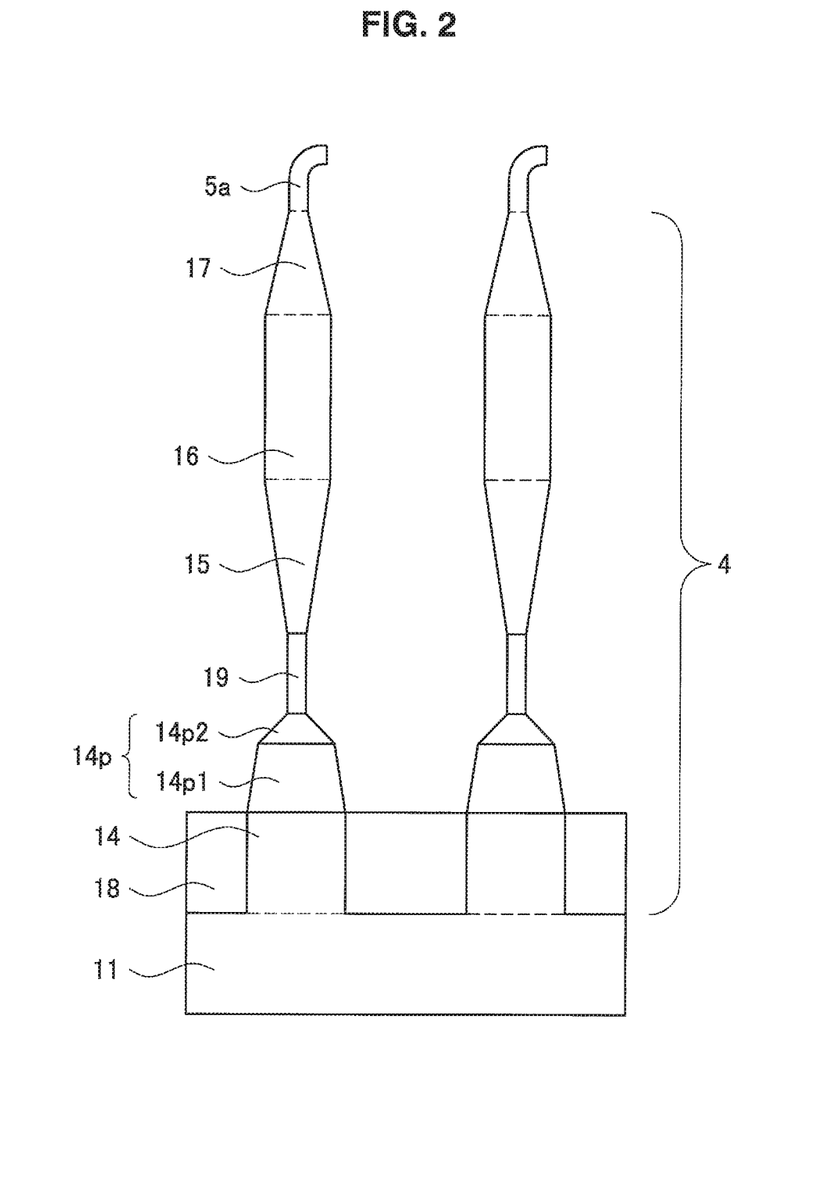
FIG. 2 is a diagram for explaining a second optical multiplexing and de-multiplexing element and is a schematic configuration diagram of a waveguide core configuring the second optical multiplexing and de-multiplexing element.

With reference to FIG. 2, there will be explained an optical multiplexing and de-multiplexing element according to a second embodiment of the present invention (in the following, referred to as a second optical multiplexing and de-multiplexing element). FIG. 2 is a diagram to show a schematic configuration for a planar pattern of a waveguide core configuring the second optical multiplexing and de-multiplexing element.

The second optical multiplexing and de-multiplexing element is different from the first optical multiplexing and de-multiplexing element in the point that a first MMI tapered portion 14$p$1 and a second MMI tapered portion 14$p$2 are configured to be connected in this order along the waveguide direction between the MMI waveguide coupler 14 and the narrow-width waveguide 19 as an MMI width change portion 14$p$. The other portions can be configured in the same manner as in the first optical multiplexing and de-multiplexing element explained with reference to FIG. 1A to FIG. 1C, and sometimes duplicated explanation will be omitted. Here, a group of the MMI waveguide coupler 14 and the MMI width change portion 14$p$ is sometimes referred to as the MMI waveguide coupler.

According to simulation, when the thickness of the MMI waveguide coupler 14 is set to 200 nm and the thickness of the step portion 18 is set to 130 nm, the width of the MMI waveguide coupler 14 is 1.5 μm at the maximum in the first optical multiplexing and de-multiplexing element, for obtaining an excess loss that is not larger than 1 dB. On the other hand, in the second optical multiplexing and de-multiplexing element, an excess loss that is also not larger than 1 dB is obtained even if the width of the MMI waveguide coupler 14 is set to approximately 3 μm.

The taper angle of the second MMI tapered portion 14$p$2 is larger than the taper angle of the first MMI tapered portion 14$p$1. Further, the widths of the second MMI tapered portion 14$p$2 and the narrow-width waveguide 19 are equal to each other at the connection position thereof. Note that, the widths of the MMI waveguide coupler 14 and the first MMI tapered portion 14$p$1, while shown to be equal to each other in FIG. 2, do not have to be the same at the connection position.

Here, the taper angle and the length in each of the first MMI tapered portion 14$p$1 and the second MMI tapered portion 14*p*2 may be designed by simulation or the like so as to realize better characteristics. Further, the step portion 18 may be provided to reach the middle of the first MMI tapered portion 14*p*1.

Here, while a configuration example has been explained to include the first MMI tapered portion 14*p*1 and the second MMI tapered portion 14*p*2 as the MMI width change portion 14*p* between the MMI waveguide couple 14 and the narrow-width waveguide 19, the embodiment is not limited to this example. The MMI width change portion 14*p* may have a structure in which the width changes curvilinearly, such as a parabola structure.

(Manufacturing Method of Optical Multiplexing and De-Multiplexing Element)

The structure of the waveguide core pattern configuring the optical multiplexing and de-multiplexing element shown in FIG. 1A to FIG. 1C and FIG. 2 can be formed by means of obtaining a Silicon on Insulator (SOI) substrate and employing the following process, for example.

First, dry etching or the like is performed on a silicon layer formed on the silicon oxide layer of the SOI substrate except for a part to become a waveguide core (waveguide core pattern structure), and the silicon layer is removed from the other part. The step portion 18 which is a step structure of the waveguide core configuring the MMI waveguide coupler 14 can be formed by two etching processes.

Next, a silicon oxide layer to surround the waveguide core pattern structure left in the dry etching processing or the like is formed by a chemical vapor deposition method (CVD) or the like. In this manner, the waveguide core and the surrounding clad layer are formed to configure the optical multiplexing and de-multiplexing element.

In this manner, since the optical multiplexing and de-multiplexing element according to this embodiment can be formed by the known etching processing, CVD method, and the like by the use of the SOI substrate, and therefore has an excellent mass productivity and can be formed simply in low cost.

(Operation of Optical Multiplexing and De-Multiplexing Element)

Figure 3A:
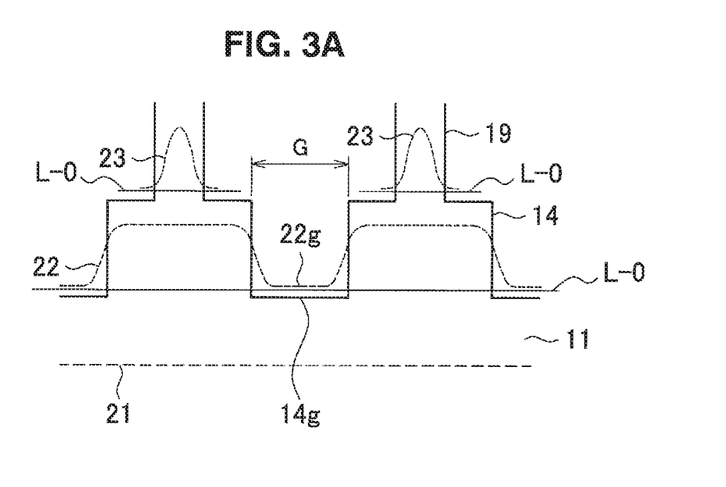
FIG. 3A is a diagram for explaining the operation of the first optical multiplexing and de-multiplexing element and is a diagram to show a propagation state of waveguide light when a step portion is not formed in an MMI waveguide coupler.
Figure 3B:
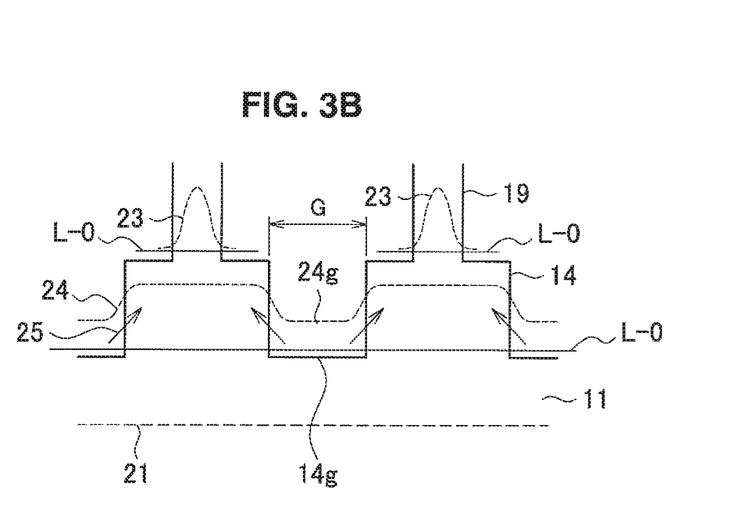
FIG. 3B is a diagram for explaining the operation of the first optical multiplexing and de-multiplexing element and is a diagram to show a propagation state of waveguide light when a step portion is formed.

With reference to FIG. 3A and FIG. 3B, there will be explained the propagation feature of waveguide light in the MMI waveguide coupler 14 and the narrow-width waveguide 19. FIG. 3A shows a propagation state of waveguide light in a structure where the step portion 18 is not formed for the MMI waveguide coupler 14 or the narrow-width waveguide 19. Further, FIG. 3B shows a propagation state of waveguide light in a structure of the first optical multiplexing and de-multiplexing element where the step portion 18 is formed for the MMI waveguide coupler 14.

FIG. 3A and FIG. 3B show propagation features of waveguide light in the slab waveguide 11, MMI waveguide coupler 14, and the narrow-width waveguide 19 by curves 21 to 24 each of which expresses a distribution of optical electric-field intensity. When each of the bottom lines (L-0) indicates zero optical electric-field intensity, these curves 21 to 24 are drawn to become apart from the bottom line (L-0), in proportion to the magnitude of the optical electric-field intensity. The curve 21 expresses an intensity distribution of the waveguide light propagated in the slab waveguide 11. While the waveguide light propagated in the slab waveguide 11 is a spherical wave, locally the light is considered to be a plane waves, and therefore the curve 21 is expressed approximately by a straight line. Here, a bottom line (L-0) indicating the minimum value of the optical electric-field intensity is omitted for the curve 21.

When the step portion 18 is not formed, as shown in FIG. 3A, the waveguide light propagated in the MMI waveguide coupler 14 has a feature shown by the curve 22.

While the propagation light is propagated in the MMI waveguide coupler 14, the propagation mode is converted and the propagation light having a propagation mode expressed by the iso-intensity curve 23 is input into the narrow-width waveguide 19. The waveguide light expressed by the iso-intensity curve 23 propagates in a fundamental propagation mode in the narrow-width waveguide 19.

A plurality of MMI waveguide couplers 14 is provided in parallel at the output end of the slab waveguide 11. The portion of the gap G between these neighboring MMI waveguide couplers 14 is referred to as a neighboring coupler gap 14*g*.

When the propagation light in the slab waveguide 11 is input into the MMI waveguide coupler 14, it leaks out from the neighboring coupler gap 14*g* to cause a radiation loss. The waveguide light in the MMI waveguide coupler 14 is input into the narrow-width waveguide 19 having a converted the propagation mode, and an energy component leaking out to the neighboring coupler gap 14*g* during propagation in the MMI waveguide coupler 14 is included partially in propagation light energy input into the narrow-width waveguide 19.

The optical electric-field intensity becomes weak in the neighboring coupler gap 14*g*, and the curve 22*g* in the neighboring coupler gap 14*g* exists at a position near the bottom line (L-0). This means that mode shape mismatching from the slab propagation light 21 increases, a large amount of the propagation light leaks out to the neighboring coupler gap 14*g*, and a large amount of radiation loss is caused here.

On the other hand, when the step portion 18 is formed, as shown in FIG. 3B, inherent waveguide light propagated in the MMI waveguide coupler 14 has a feature expressed by the curve 24.

Here, when an inherent optical electric-field intensity in the neighboring coupler gap 14*g* is compared between the case where the step portion 18 is not formed (curve 22*g*) and the case where the step portion 18 is formed (curve 24*g*), it is found that the inherent optical electric-field intensity is stronger in the case where the step portion 18 is formed.

When the waveguide light of the MMI waveguide coupler 14 is input into the narrow-width waveguide 19 having the converted propagation mode, a ratio of mode matching with the slab propagation light 21 becomes large and also the propagation light energy input into the narrow-width waveguide 19 becomes large, as the optical electric-field intensity becomes stronger in the neighboring coupler gap 14*g*. That is, when the step portion 18 is formed, the optical electric-field intensity in the neighboring coupler gap 14*g* is stronger than the case where the step portion 18 is not formed. The light in this neighboring coupler gap 14*g* is absorbed in the MMI waveguide coupler 14 during propagation as shown by the arrow 25 in FIG. 3B. As the result, the optical electric-field intensity of the propagation light input into the narrow-width waveguide 19 becomes stronger when the step portion 18 is provided.

The above has explained the case where the waveguide light travels from the slab waveguide 11 toward the MMI waveguide coupler 14, and the waveguide light input into the slab waveguide 11 is de-multiplexed into the plurality of MMI waveguide couplers 14 (case of utilization as an optical de-multiplexer). On the other hand, when light propagated in the plurality of MMI waveguide couplers 14 is multiplexed into the slab waveguide 11 (case of utilization as an optical multiplexer), a reverse process of the process in the case of de-multiplexing is performed, the propagation light of the fundamental propagation mode propagated in the narrow-width waveguide 19 is converted into the propagation mode expressed by the iso-intensity curve 24 at the connection position between the MMI waveguide coupler 14 and the slab waveguide 11 and is coupled with the propagation mode expressed by the iso-intensity curve 21 in which light is propagated in the slab waveguide 11. Accordingly, it is found that it is preferable to include the step portion 18 also in the case of utilization as the optical multiplexer.

(Simulation of Operation Characteristics)

With reference to FIG. 4A to FIG. 6, there will be explained a result of simulation of the operation of the optical multiplexing and de-multiplexing element, using a three-dimensional Finite-Difference Time-Domain (FDTD) method.

Figure 4A:
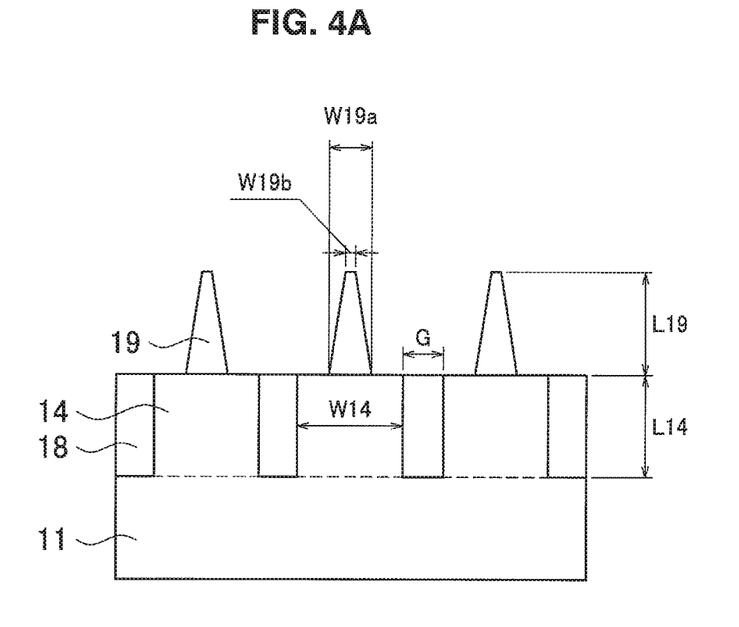
FIG. 4A is a diagram for explaining a simulation result of the operation in the first optical multiplexing and de-multiplexing element by the use of three-dimensional FDTD.
Figure 4B:
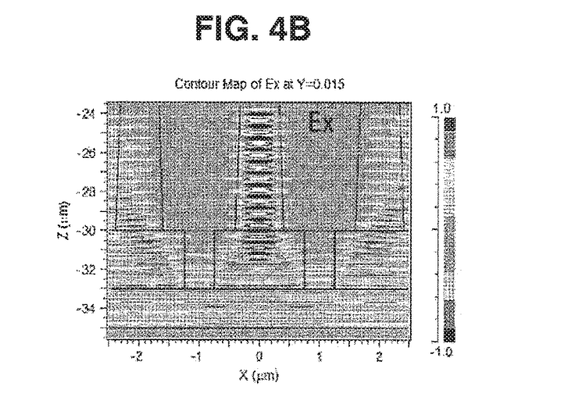
FIG. 4B is a diagram for explaining a simulation result of the operation in the first optical multiplexing and de-multiplexing element by the use of three-dimensional FDTD.
Figure 4C:
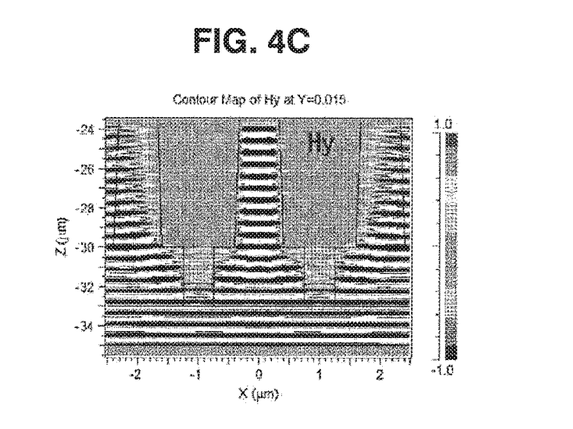
FIG. 4C is a diagram for explaining a simulation result of the operation in the first optical multiplexing and de-multiplexing element by the use of three-dimensional FDTD.
Figure 4D:
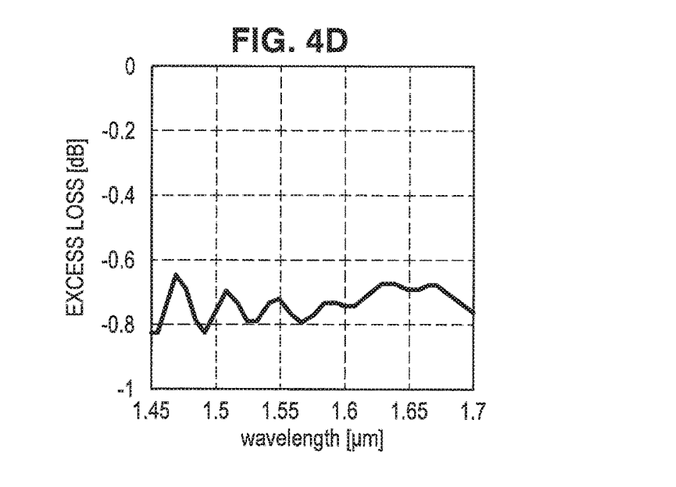
FIG. 4D is a diagram for explaining a simulation result of the operation in the first optical multiplexing and de-multiplexing element by the use of three-dimensional FDTD.

FIG. 4A to FIG. 4D are diagrams for explaining simulation results of the first optical multiplexing and de-multiplexing element. FIG. 4A is a schematic diagram of the first optical multiplexing and de-multiplexing element. FIG. 4B and FIG. 4C show an Ex component and an Hy component of a TE wave, respectively. Further, FIG. 4D is a diagram to show a wavelength dependence of an excess loss, expressing a wavelength (unit: μm) in the horizontal axis and expressing the excess loss (unit: dB) in the vertical axis.

Here, the width W14 and the length L14 of the MMI waveguide coupler 14 are assumed to be 1.5 μm and 2.712 μm, respectively, and the width G of the neighboring coupler gap 14g is assumed to be 500 nm. Further, the thickness of the MMI waveguide coupler 14 is assumed to be 200 nm, and the thickness of the step portion 18 is assumed to be 130 nm.

For the narrow-width waveguide 19, the connection width W19a with the MMI waveguide couple 14 on one end side is assumed to be 800 nm, and the width W19b at the other end side is assumed to be 500 nm of a single mode width, and the length L19 of the narrow-width waveguide 19 is assumed to be 13.5 μm.

As shown in FIG. 4B and FIG. 4C, when a TE wave having a wavelength of 1.6 μm is propagated, a plane wave propagated in the slab waveguide 11 is propagated for a while in the neighboring coupler gap 14g, and moves into the MMI waveguide coupler 14 during the propagation. As the result, the amount of the light propagated in the neighboring coupler gap 14g is reduced at the connection position between the MMI waveguide coupler 14 and the narrow-width waveguide 19, that is, at the end part of the MMI waveguide coupler 14.

Further, as shown in FIG. 4D, the excess loss is suppressed to approximately 0.65 to 0.82 dB in a wavelength range of 1.45 to 1.7 μm.

Here, when similar simulation is performed on the configuration without providing the step portion 18, the excess loss has a large value of 2.5 to 3 dB. Further, in the configuration without providing the step portion 18, it is found that a number of modes are excited in the MMI waveguide coupler 14 and light is not collected tidily.

Figure 5A:
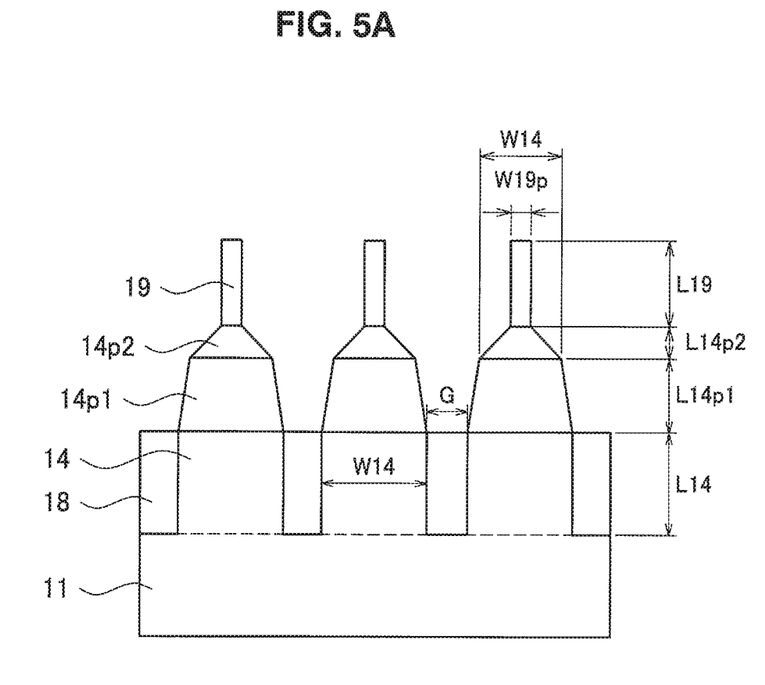
FIG. 5A is a diagram for explaining a simulation result of the operation in the second optical multiplexing and de-multiplexing element by the use of three-dimensional FDTD.
Figure 5B:
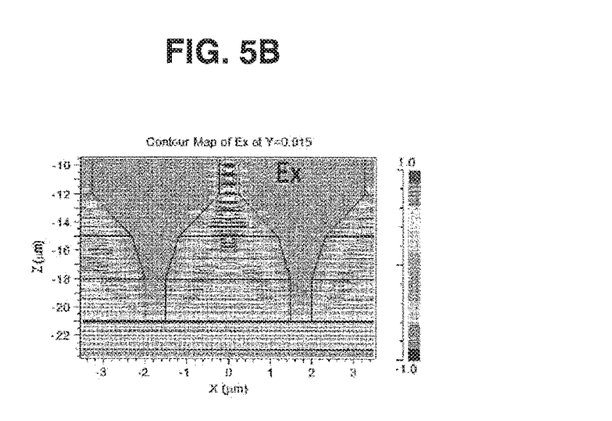
FIG. 5B is a diagram for explaining a simulation result of the operation in the second optical multiplexing and de-multiplexing element by the use of three-dimensional FDTD.
Figure 5C:
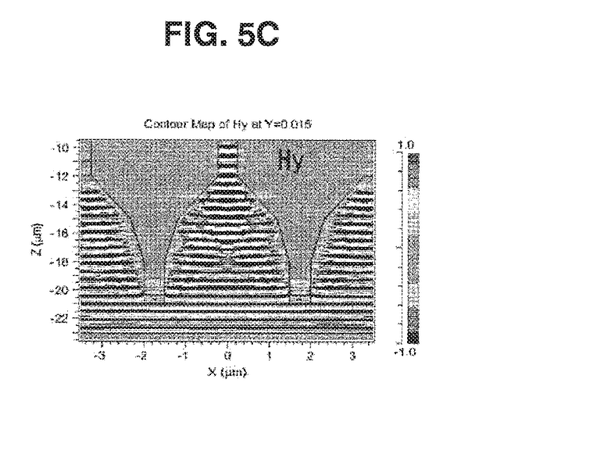
FIG. 5C is a diagram for explaining a simulation result of the operation in the second optical multiplexing and de-multiplexing element by the use of three-dimensional FDTD.
Figure 5D:
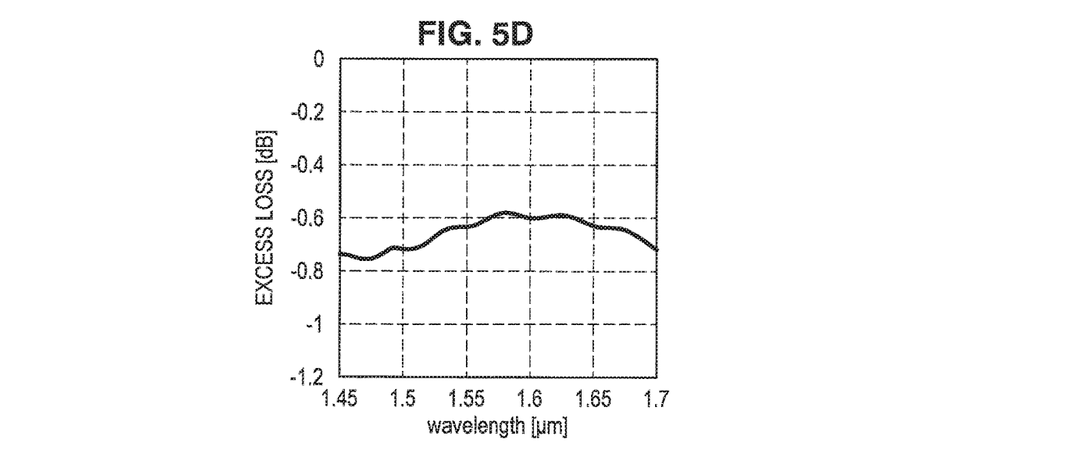
FIG. 5D is a diagram for explaining a simulation result of the operation in the second optical multiplexing and de-multiplexing element by the use of three-dimensional FDTD.

FIG. 5A to FIG. 5D are diagrams for explaining simulation results for the second optical multiplexing and de-multiplexing element. FIG. 5A is a schematic diagram of the second optical multiplexing and de-multiplexing element. FIG. 5B and FIG. 5C show an Ex component and an Hy component of a TE wave, respectively. Further, FIG. 5D is a diagram to show a wavelength dependence of an excess loss, expressing a wavelength (unit: μm) in the horizontal axis and expressing the excess loss (unit: dB) in the vertical axis.

Here, the width W14 and the length L14 of the MMI waveguide coupler 14 are assumed to be 3 μm and 2.8516 μm, respectively, and the width G of the neighboring coupler gap 14g is assumed to be 500 nm. Further, the thickness of the MMI waveguide coupler 14 is assumed to be 200 nm, and the thickness of the step portion 18 is assumed to be 130 nm.

For the narrow-width waveguide 19, the width W19 is assumed to have a constant value of 460 nm and the length L19 is assumed to be 13.5 μm.

The connection width W14p of the first MMI tapered portion 14p1 and the second MMI tapered portion 14p2 is assumed to be 1.73 μm which is an intermediate value between the width W14 of the MMI waveguide coupler 14 and the width W19 of the narrow-width waveguide 19. The length L14p1 of the first MMI tapered portion 14p1 is assumed to be the same as the length L14 of the MMI waveguide coupler 14, and the length L14p2 of the second MMI tapered portion 14p2 is assumed to be ⅔ of the length L14 of the MMI waveguide coupler 14.

As shown in FIG. 5B and FIG. 5C, the plane wave propagated in the slab waveguide 11 propagates for a while in the neighboring coupler gap 14g, and moves into the MMI waveguide coupler 14 during the propagation. As the result, the amount of the light propagated in the neighboring coupler gap 14g is reduced at the connection position between the MMI waveguide coupler 14 and the narrow-width waveguide 19, that is, the end part of the MMI waveguide coupler 14, and the light propagated in the neighboring coupler gap 14g does not exist in the end part of the step portion 18.

Further, as shown in FIG. 5D, the excess loss is suppressed to approximately 0.59 to 0.77 dB in a wavelength range of 1.45 to 1.7 μm.

Figure 6:
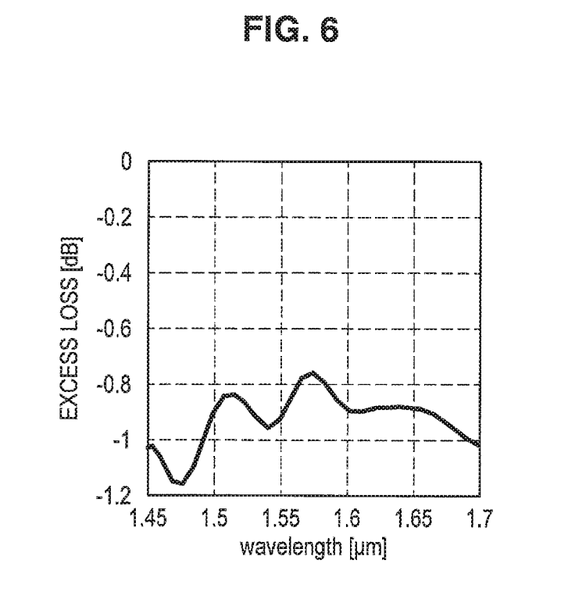
FIG. 6 is a diagram for explaining a simulation result of the operation in the second optical multiplexing and de-multiplexing element by the use of three-dimensional FDTD under another condition.

FIG. 6 is a diagram for explaining a simulation result for the second optical multiplexing and de-multiplexing element under another condition. FIG. 6 is a diagram to show a wavelength dependence of the excess loss, expressing a wavelength (unit: μm) in the horizontal axis and expressing the excess loss (unit: dB) in the vertical axis.

Here, the width W14 and the length L14 of the MMI waveguide coupler 14 are assumed to be 5 μm and 6.93 μm, respectively, and the width G of the neighboring coupler gap 14g is assumed to be 500 nm. Further, the thickness of the MMI waveguide coupler 14 is assumed to be 200 nm, and the thickness of the step portion 18 is assumed to be 130 nm.

For the narrow-width waveguide 19, the width W19 is assumed to have a constant value of 460 nm and the length L19 is assumed to be 13.5 μm.

The connection width W14p of the first MMI tapered portion 14p1 and the second MMI tapered portion 14p2 is assumed to be 2.73 μm which is an intermediate value between the width W14 of the MMI waveguide coupler 14 and the width W19 of the narrow-width waveguide 19. The length L14p1 of the first MMI tapered portion 14p1 is assumed to be the same as the length L14 of the MMI waveguide coupler 14, and the length L14p2 of the second MMI tapered portion 14p2 is ½.7 of the length L14 of the MMI waveguide coupler 14.

As shown in FIG. 6, the excess loss is suppressed to approximately 0.75 to 1.15 dB in a wavelength range of 1.45 to 1.7 μm.

(Arrayed-Waveguide Grating-Type Optical Wavelength Filter)

Figure 7:
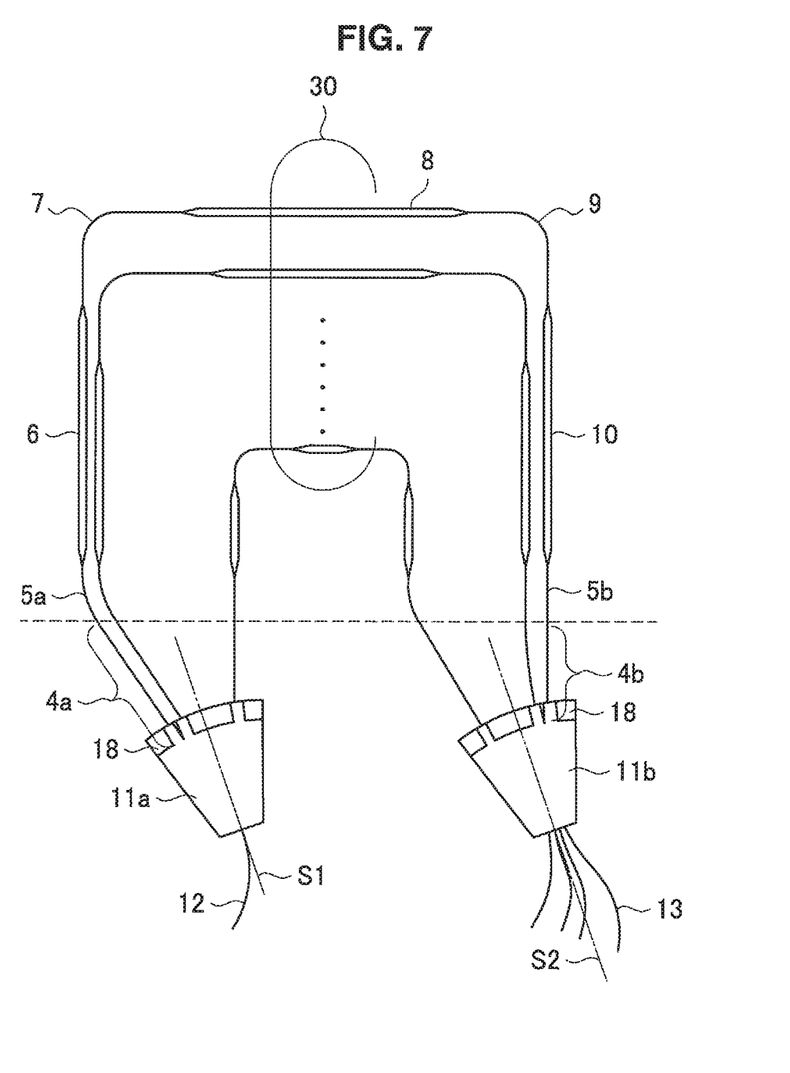
FIG. 7 is a diagram for explaining an AWG-type optical wavelength filter.

With reference to FIG. 7, there will be explained an AWG-type optical wavelength filter according to an embodiment of the present invention. The AWG-type optical wavelength filter according to an embodiment of the present invention is configured to include an input waveguide 12, an input-side slab waveguide 11a, an input-side waveguide structure 4a, an arrayed waveguide 30 configured with a plurality of channel waveguides having different optical path lengths, an output-side waveguide structure 4b, an output-side slab waveguide 11b, and an output waveguide 13 that are connected in this order.

The output waveguide 13 is configured to have a plurality of arrayed waveguides. That is, the AWG-type optical wavelength filter shown in FIG. 7 is an optical wavelength filter having a configuration in which input light input into the input waveguide 12 is de-multiplexed for each wavelength to be output from the output waveguide 13. Each of a set of the input-side slab waveguide 11a and the input-side waveguide structure 4a and a set of the output-side slab waveguide 11b and the output-side waveguide structure 4b is formed by the use of the above first or second optical multiplexing and de-multiplexing element.

Each of the plurality of channel waveguides configuring the arrayed waveguide 30 includes an input-side curved waveguide 5a, a first straight waveguide 6, a first curved waveguide 7, a second straight waveguide 8, a second curved waveguide 9, a third straight waveguide 10, an output-side curved waveguide 5b that are connected in this order. Note that sometimes the input-side waveguide structure 4a and the output-side waveguide structure 4b are included in the arrayed waveguide 30 in the following explanation.

Input light is input into the input-side slab waveguide 11a from the input waveguide 12, and output light is output from the output-side slab waveguide 11b to the outside via the output waveguide 13. The input-side slab waveguide 11a and the output-side slab waveguide 11b are disposed so as to cause the symmetry center axis S1 of the input-side slab waveguide 11a and the symmetry center axis S2 of the output-side slab waveguide 11b to be parallel to each other.

In each of the plurality of channel waveguides configuring the arrayed waveguide 30, the sum of the total length of the input-side waveguide structure 4a and the total length of the output-side waveguide structure 4b are set to be equal to each other. Further, the curvature radiuses of the curved parts in a pair of input-side curved waveguide 5a and the output-side curved waveguide 5b are set to be equal to each other. This is because, if the curvature radiuses are different from each other, equivalent refraction indexes are also different from each other to cause the phase error.

In each of the plurality of channel waveguides configuring the arrayed waveguide 30, the first curved waveguide 7 and the second curved waveguide 9 are configured to have the same structure so as not to cause the phase error in this curved waveguide part. Further, the waveguide widths of the first straight waveguide 6, the second straight waveguide 8, and the third straight waveguide 10 are set to be in a range of 0.7 to 1 μm for reducing the effect of the phase error which is caused in this straight waveguides and applied to the characteristics of the AWG-type optical wavelength filter.

On the other hand, the waveguide widths of the input-side curved waveguide 5a, the output-side curved waveguide 5b, the first curved waveguide 7, and the second curved waveguide 9 are set to 300 to 500 nm where the fundamental propagation mode is guaranteed so as not to cause propagation mode conversion in this waveguide part. Note that a width-tapered waveguide is used for a coupling area connecting the straight waveguide part and the curved waveguide part so as to cancel the waveguide width difference between both of the waveguide parts smoothly.

Further, the second straight waveguide 8 is disposed at the center of the arrayed waveguide 30, and the first straight waveguide 6 and the third straight waveguide 10 are disposed symmetrically about the second straight waveguide 8. The first curved waveguide 7 and the second curved waveguide 9 are also disposed symmetrically about the second straight waveguide 8.

According to the AWG-type optical wavelength filter shown in FIG. 7, the first or second optical multiplexing and de-multiplexing element explained with reference to FIG. 1A to FIG. 1C or FIG. 2 is used for a set of the input-side slab waveguide 11a and the input-side waveguide structure 4a, and a set of the output-side slab waveguide 11b and the output-side waveguide structure 4b. Accordingly, the radiation loss caused in both of the connection areas is reduced, and therefore an AWG-type optical wavelength filter having reduced radiation loss as a whole is realized.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. An optical multiplexing and de-multiplexing element, comprising:
    a slab waveguide; and
    a waveguide structure, the waveguide structure including
        a multi-mode interference (MMI) waveguide coupler and a narrow-width waveguide, the MMI waveguide coupler connected between the narrow-width waveguide and the slab waveguide along a first direction defining a waveguide direction, and
        step portions formed on both sides of the MMI waveguide coupler and extending along the sides of the MMI waveguide coupler in the waveguide direction,
    wherein a thickness of each step portion is less than a thickness of the MMI waveguide coupler, and
    a length of each step portion, from the slab waveguide towards the narrow-width waveguide, along the waveguide direction is equal to a length of the MMI waveguide coupler, from the slab waveguide towards the narrow-width waveguide, along the waveguide direction.

2. The optical multiplexing and de-multiplexing element according to claim 1, further comprising:
    an MMI width change portion disposed between the MMI waveguide coupler and the narrow-width waveguide, the MMI width change portion having a first width at a first end connected to the MMI waveguide coupler and a second width at a second end connected to the narrow-width waveguide,
    wherein the first width is a width of the MMI waveguide coupler, the second width is the width of the narrow-width waveguide, and the second width is less than the first width.

3. The optical multiplexing and de-multiplexing element according to claim 2,
    wherein the MMI width change portion includes a first MMI tapered portion and a second MMI tapered portion which have taper angles different from each other, a first end of the first MMI tapered portion is connected to the narrow-width waveguide and has a same width as the narrow-width waveguide, a second end of the first MMI tapered portion is connected to a first end of the second MMI tapered portion and has a same width as the first end of the second MMI tapered portion, and a second end of the second MMI tapered portion is connected to the MMI waveguide coupler and has a same width as the MMI waveguide coupler.

4. The optical multiplexing and de-multiplexing element according to claim 1,
wherein the waveguide structure includes a first tapered waveguide, a wide-width waveguide, and a second tapered waveguide, and
the narrow-width waveguide, the first tapered waveguide, the wide-width waveguide, and the second tapered waveguide are connected end-to-end along the waveguide direction.

5. The optical multiplexing and de-multiplexing element according to claim 1, wherein the waveguide structure is made up of a waveguide core made of silicon and a clad layer, made of silicon, surrounding the waveguide core.

6. An arrayed-waveguide grating-type optical wavelength filter, comprising:
an input waveguide;
an input-side slab waveguide;
an input-side waveguide structure;
an arrayed waveguide including a plurality of channel waveguides having different optical path lengths;
an output-side waveguide structure;
an output-side slab waveguide; and
an output waveguide,
wherein the input waveguide, the input-side slab waveguide, the input-side waveguide structure, the arrayed waveguide, the output-side waveguide structure, the output-side slab waveguide, and the output waveguide are connected end-to-end, and
each of a set of the input-side slab waveguide and the input-side waveguide structure and a set of the output-side slab waveguide and the output-side waveguide structure corresponds to the optical multiplexing and de-multiplexing element according to claim 1.

7. The arrayed-waveguide grating-type optical wavelength filter according to claim 6,
wherein each of the plurality of channel waveguides includes an input-side curved waveguide, a first straight waveguide, a first curved waveguide, a second straight waveguide, a second curved waveguide, a third straight waveguide, and an output-side curved waveguide, and
the input-side curved waveguide, the first straight waveguide, the first curved waveguide, the second straight waveguide, the second curved waveguide, the third straight waveguide, and the output-side curved waveguide are connected end-to-end.

* * * * *